3,275,671
STABILIZATION OF ORGANIC ISOCYANATES WITH MONOALKENYL-THIOUREAS
David T. Manning, South Charleston, W. Va., assignor to Union Carbide Corporation, a corporation of New York
No Drawing. Filed Dec. 3, 1963, Ser. No. 327,811
5 Claims. (Cl. 260—453)

This invention relates to isocyanate compositions, particularly an isocyanate composition stabilized from discoloration.

Isocyanates are typically colorless liquids or solids which are found to discolor on storage. Discoloration of isocyanates deleteriously affects their saleability typically because the color may be transferred to the product in which the isocyanate is employed. This is particularly so in the case of polyisocyanates used in resin manufacture.

It is herein provided an agent which significantly retards discoloration of the isocyanate product thus allowing storage of the isocyanate for reasonable periods of time prior to use. These agents are particularly effective when employed in solution with the isocyanate.

The agents employed in this invention for retarding discoloration of organic isocyanates are organic thioureas possessing one nitrogen atom bearing two hydrogen atoms, the other nitrogen atom bearing one directly-bonded alkenyl radical. Of particular significance are thioureas having the formula:

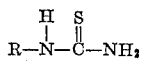

wherein R is an alkenyl radical having from 2 to 18 carbon atoms, preferably from 2 to 8 carbon atoms, and the allyl radical is usually most preferred.

Exemplifications of the aforementioned class of thioureas include:

1-allylthiourea,
1-(3-buten-2-yl)thiourea,
1-(5-hexen-4-yl)thiourea,
1-(1-phenyl-3-buten-2-yl)thiourea,
1-(2-methylallyl)thiourea,
1-(2-cyclohexylallyl)thiourea,
1-(1,2-dimethyl-3-buten-2-yl)thiourea,
1-(2-butenyl)thiourea,
1-(2-hexenyl)thiourea,
1-(4-ethyl-6-octenyl)thiourea,
1,(2,4-hexadienyl)thiourea,
1-(3-phenylallyl)thiourea,
1-(2-methyl-1-propenylallyl)thiourea,
1-(1-cyclohexyl-2-methyl-2-pentenyl)-thiourea,
and the like.

The isocyanates which may be treated to retard discoloration are organic mono and polyisocyanates, such as aliphatic, cycloaliphatic and aromatic mono-, di-, tri- and/or other polyisocyanates which tend to discolor under conditions of moisture and temperature typically associated with industrial stortage procedures. Illustrative of organic isocyanates which are beneficially stabilized from discoloration include the following:

tolylene-2,4 and
2,6-diisocyanate,
4,4'-methylenedi-o-tolylisocyanate,
2,4,4'-triisocyanatodiphenylether,
toluene-2,3,6-triisocyanate,
1-methoxy-2,4,6-triisocyanatobenzene,
m-phenylenediisocyanate,
4-chloro-m-phenylenediisocyanate,
4,4'-biphenyldiisocyanate,
1,5-naphthalenediisocyanate,
1,4-tetramethylenediisocyanate,
1,6-hexamethylenediisocyanate,
1,10-decamethylenediisocyanate,
1,4-cyclohexanediisocyanate,
1,2-ethylenediisocyanate,
4,4'-methylenediphenylisocyanate,
bis(4-isocyanatocyclohexyl)methane,
stilbene diisocyanates,
dixylylmethane diisocyanates,
2,2-bis(p-isocyanatophenyl)-propane,
diphenylmethane tetraisocyanates,
trimethylbenzene triisocyanates,
phenyltolylmethane triisocyanates,
ditolylmethane triisocyanates,
triphenylmethane triisocyanates,
3,3'-dimethyldiphenylene-4,4'-diisocyanate,
3,3'-dimethoxydiphenylene-4,4'-diisocyanate,
diphenyl triisocyanates
and isomers of bis(p,p'-isocyanatophenyl)cyclohexane.

The particular color retardation agent selected (color stabilizing agents) should be capable of dissolution in the particular isocyanate to be stabilized regardless of whether the isocyanate is a liquid at ambient temperature or must be warmed to transform it to the liquid state. The selected agent should be stable at the temperature of the isocyanate at the time of incorporation, and incorporation be effected at a temperature below that of decomposition or of any undesirable reaction of the isocyanate with itself or the agent. The agent, or mixtures of the agents, should be employed in the isocyanate in any amount sufficient to retard discoloration. Usually that amount falls between 0.005 and 5 percent by weight of the isocyanate. Preferably, the agent is employed in amounts from about 0.01 to 1.0 percent by weight of isocyanate. In general, this invention is directed to employing an amount of the agent sufficient to retard discoloration of the isocyanate.

The following serves to specifically illustrate operation of this invention but, however, it is not intended to limit the scope of this invention:

A dry Nessler tube is charged with a solution of colorless, pure, freshly-distilled tolylene diisocyanate (80 weight percent 2,4-tolylene diisocyanate and 20 weight percent 2,6-tolylene diisocyanate) containing 0.04 percent by weight of 1-allyl-2-thiourea. The solution is blanketed under dry air and the tube securely sealed to prevent further contact with the atmosphere. A similar sample is prepared, but without the added 1-allyl-2-thiourea, for use as a blank.

Both the blank and 1-allyl-2-thiourea test samples are stored at room temperature at about 25° C. Examination of the blank and thiourea samples after storage for about 100 hours reveals the development of discoloration in the blank sample whereas the 1-allyl-2-thiourea test sample remains essentially colorless and that after 330 hours the thiourea sample exhibits only mild discoloration.

This invention is not to be considered as limited by the specific features described above, except to the extent such features are set forth in the claims.

What is claimed is:

1. An isocyanate solution comprising an amount of thiourea sufficient to retard discoloration of the isocyanate, said thiourea possessing one nitrogen atom bearing two hydrogen atoms and the other nitrogen bearing one directly bonded alkenyl radical.

2. An organic isocyanate solution comprising an amount of monoalkenylthiourea sufficient to retard discoloration of the organic isocyanate.

3. An organic polyisocyanate solution comprising an amount of monoalkenylthiourea sufficient to retard discoloration of the organic polyisocyanate.

4. The solution of claim 3 wherein the organic polyisocyanate is tolylene diisocyanate.

5. The solution of claim 4 wherein the monoalkenylthiourea is 1-allyl-2-thiourea.

References Cited by the Examiner
UNITED STATES PATENTS 2,885,421   5/1959   Spiegler _____ 260—453

CHARLES B. PARKER, *Primary Examiner.*
DALE R. MAHANAND, *Assistant Examiner.*